United States Patent
Ti

(10) Patent No.: US 11,798,147 B2
(45) Date of Patent: Oct. 24, 2023

(54) IMAGE PROCESSING METHOD AND DEVICE

(71) Applicant: Huawei Technologies Co., Ltd., Shenzhen (CN)

(72) Inventor: Chunli Ti, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/136,902

(22) Filed: Dec. 29, 2020

(65) Prior Publication Data

US 2021/0118111 A1    Apr. 22, 2021

Related U.S. Application Data

(63) Continuation of application No. PCT/CN2019/074780, filed on Feb. 11, 2019.

(30) Foreign Application Priority Data

Jun. 30, 2018  (CN) .......................... 201810703983.3

(51) Int. Cl.
*G06T 5/50*  (2006.01)
*G06T 7/55*  (2017.01)

(52) U.S. Cl.
CPC .................. *G06T 5/50* (2013.01); *G06T 7/55* (2017.01); *G06T 2207/10024* (2013.01); *G06T 2207/10048* (2013.01); *G06T 2207/20221* (2013.01)

(58) Field of Classification Search
CPC ... G06T 5/50; G06T 7/55; G06T 2207/10024; G06T 2207/10048; G06T 2207/20221;
(Continued)

(56) References Cited

U.S. PATENT DOCUMENTS

| 2008/0080787 A1* | 4/2008 | Yang ......................... G06T 5/50 |
| | | 382/284 |
| 2011/0026808 A1* | 2/2011 | Kim ......................... G06T 7/50 |
| | | 348/43 |

(Continued)

FOREIGN PATENT DOCUMENTS

| CN | 102163325 A | 8/2011 |
| CN | 104463817 A | 3/2015 |

(Continued)

OTHER PUBLICATIONS

Zhu et al., English Translation of CN 104463817, 2015. (Year: 2015).*

(Continued)

*Primary Examiner* — Phuoc Tran
(74) *Attorney, Agent, or Firm* — Conley Rose, P.C.

(57) ABSTRACT

An image processing method includes obtaining a first image and a second image, for the first image and the second image, separately obtaining, through calculation, a gradient saliency feature map of the image, based on the gradient saliency feature maps of the first image and the second image, performing feature matching between the first image and the second image to obtain a dense disparity map of the first image, and based on the dense disparity map of the first image, performing disparity translation on a pixel in the second image corresponding to a pixel in the first image, and fusing the first image and the pixel in the second image.

20 Claims, 3 Drawing Sheets

(58) Field of Classification Search
CPC . G06T 2207/10036; G06T 2207/20016; G06T 2207/20064; G06T 2207/30232; G06T 7/33
See application file for complete search history.

(56) References Cited

U.S. PATENT DOCUMENTS

| | | | |
|---|---|---|---|
| 2014/0133779 | A1 | 5/2014 | Funabashi et al. |
| 2014/0321712 | A1* | 10/2014 | Ciurea .................... G06T 7/593 382/106 |
| 2015/0348273 | A1* | 12/2015 | Chapiro ............... H04N 13/111 348/54 |
| 2018/0338092 | A1 | 11/2018 | Fan et al. |
| 2019/0020861 | A1* | 1/2019 | Leonard .................. G06T 7/593 |

FOREIGN PATENT DOCUMENTS

| | | |
|---|---|---|
| CN | 106488201 A | 3/2017 |
| CN | 106548482 A | 3/2017 |
| CN | 106600572 A | 4/2017 |
| CN | 104392447 B | 10/2017 |
| CN | 106500852 B | 11/2018 |
| CN | 105809640 B | 1/2019 |
| CN | 106651897 B | 12/2019 |
| JP | 2013218660 A | 10/2013 |

OTHER PUBLICATIONS

Jeon, H., et al., "Stereo Matching with Color and Monochrome Cameras in Low-light Conditions," 2016, 9 pages.

* cited by examiner

IMAGE PROCESSING METHOD AND DEVICE

CROSS-REFERENCE TO RELATED APPLICATIONS

This application is a continuation of International Patent Application No. PCT/CN2019/074780 filed on Feb. 11, 2019, which claims priority to Chinese Patent Application No. 201810703983.3 filed on Jun. 30, 2018. The disclosures of the aforementioned applications are hereby incorporated by reference in their entireties.

TECHNICAL FIELD

The present disclosure relates to the field of information processing, and in particular, to an image processing method and a device.

BACKGROUND

In a scenario such as security surveillance, a single visible light sensor cannot meet information collection requirements in a low illumination scenario and a haze scenario. Various sensors such as a near infrared sensor, a thermal infrared sensor, a dynamic vision sensor (DVS), a multi-spectral sensor, and a hyper-spectral sensor can be used in addition to the visible light sensor. The visible light sensor and another type of sensor are configured on a same platform or device at the same time, and image information obtained by the visible light sensor and another type of sensor is fused, to output a color image with low noise and high contrast, and to provide additional scenario classification information.

In a case of a plurality of sensors, because locations of different sensors are different, pixel locations of a same object in multi-source images obtained from the plurality of sensors are different. Currently, a common practice is to match feature points of multi-source images and then fuse the multi-source images.

However, in another approach, a fused image has obvious artifacts, and a matching success rate is low, and therefore quality of the fused image is reduced.

SUMMARY

Embodiments of the present disclosure provide an image processing method and a device, to improve a success rate of multi-source image fusion and quality of a fused image.

According to a first aspect, embodiments of the present disclosure provides an image processing method, including obtaining a first image and a second image, for the first image and the second image, separately obtaining, through calculation, a gradient saliency feature map of the image, based on the gradient saliency feature maps of the first image and the second image, performing feature matching between the first image and the second image to obtain a dense disparity map of the first image, and based on the dense disparity map of the first image, performing disparity translation on a pixel in the second image corresponding to a pixel in the first image, and fusing the first image and the pixel in the second image.

In the foregoing method, a correlation between a texture and a contour that are of multi-source images is used, and a gradient saliency feature map is extracted, to resolve a problem that a feature cannot be matched due to luminance distribution differences of data of different sensors. This improves a success rate of multi-source image fusion and quality of a fused image.

In a possible design, the obtaining, through calculation, a gradient saliency feature map of the image includes extracting a vertical gradient and a horizontal gradient that are of each band in the image by using a gradient operator, and obtaining, through calculation based on the vertical gradient and the horizontal gradient, a gradient saliency feature map of each band in the image, and performing weighted averaging on each pixel in the gradient saliency feature map of each band, to obtain a gradient saliency map of the image.

In another possible design, after the first image and the second image are obtained, the first image and/or the second image are/is adjusted, so that there is only horizontal disparity between the adjusted first image and the adjusted second image.

In another possible design, the performing feature matching between the first image and the second image to obtain a dense disparity map of the first image includes searching, in the second image along a disparity direction, any matching unit in the first image, to obtain a disparity value that has a minimum feature difference.

In another possible design, the matching unit is a neighborhood of each pixel in the first image, and a disparity value obtained after feature matching is performed on the neighborhood of each pixel is used as a disparity value of the pixel, and the feature matching is performed on all pixels in the first image to obtain the dense disparity map of the first image.

In another possible design, the first image is segmented into a plurality of superpixels, the matching unit is the segmented superpixel, and each superpixel in the first image is searched in the second image along the disparity direction to obtain a disparity value that has a minimum feature difference and that is used as a disparity value of all pixels in the superpixel.

In another possible design, the first image is a near infrared image, and the second image is a color visible light image, and the performing disparity translation on a pixel in the second image corresponding to a pixel in the first image, and fusing the pixels in the second image and the first image specifically includes, based on the dense disparity map, and for each pixel in the near infrared image, performing translation, based on a corresponding disparity value, on color information of a pixel that corresponds to each pixel in the near infrared image and that is in the color image, to obtain color information of a fused image, and performing the weighted averaging on a luminance value of a pixel corresponding to the color image and a luminance value of the near infrared image, to obtain luminance information of the fused image.

In another possible design, the first image is a color visible light image, and the second image is a thermal infrared image, and the performing disparity translation on a pixel in the second image corresponding to a pixel in the first image, and fusing the pixels in the second image and the first image specifically includes, based on the dense disparity map, and for each pixel in the color image, performing translation, based on estimated disparity, on luminance information of a pixel that corresponds to each pixel in the color image and that is in the thermal infrared image, and performing weighting on a luminance value of the thermal infrared image and a luminance value of the color image to obtain a luminance value of a fused image, or normalizing a luminance value of the thermal infrared image and multiplying the normalized luminance value of the thermal infrared image by the luminance value of the color image at a corresponding location to obtain the luminance value of the fused image.

In another possible design, the first image is a color visible light image, and the second image is a DVS texture image, and the performing disparity translation on a pixel in the second image corresponding to a pixel in the first image, and fusing the pixels in the second image and the first image specifically includes, based on the dense disparity map, and for each pixel in the color image, performing translation, based on estimated disparity, on luminance information of a pixel that corresponds to each pixel in the color image and that is in the DVS texture image, performing wavelet decomposition or pyramid decomposition on a luminance component of the color image, to divide the luminance component into a low-frequency component and a high-frequency component, and performing weighting on the high-frequency component of the color image and the translated DVS texture image to obtain a new high-frequency component, and an inverse transform operation is performed on the new high-frequency and the low-frequency component of the color image to obtain a luminance component of a fused image.

In another possible design, the first image is a multispectral image (MSI) image, and the second image is a hyperspectral image (HSI) image, and the performing disparity translation on a pixel in the second image corresponding to a pixel in the first image, and fusing the pixels in the second image and the first image specifically includes, based on the dense disparity map, and for each pixel in the MSI image, performing translation, based on estimated disparity, on a pixel that corresponds to each pixel in the MSI image and that is in the HSI image, performing radiation calibration on the MSI image and the HSI image, separately extracting, in an endmember extraction method, a spectral endmember of the MSI and a spectral endmember of the HSI, and calculating an initial abundance matrix of the MSI and an initial abundance matrix of the HSI, and performing combined unmixing by using a space spectrum correlation of the MSI and the HSI, updating, by using multiplication iterations, the endmembers and the abundance matrices to convergence, and multiplying an obtained high spatial resolution abundance matrix by a hyper-spectral endmember, to obtain a fused image.

According to a second aspect, embodiments of the present disclosure provides an image processing apparatus that has a function of implementing the foregoing method. The function may be implemented by hardware, or may be implemented by hardware by executing corresponding software. The hardware or software includes one or more units corresponding to the foregoing function, for example, includes an image obtaining unit, a gradient calculation unit, a disparity estimation unit, and an image fusion unit.

In a possible design, a structure of the image processing apparatus includes a processor and a memory, where the memory is configured to store application program code of the foregoing method, and the processor is configured to execute a program stored in the memory. The image processing apparatus further includes a communications interface, configured to communicate with another apparatus.

According to a third aspect, embodiments of the present disclosure provides a computer storage medium, configured to store a computer software instruction for use by the foregoing image processing apparatus, where the computer software instruction includes a program designed for performing the foregoing method.

According to the foregoing image processing technical solution provided in the embodiments of the present disclosure, the correlation between the texture and the contour that are of the multi-source images is used, and the gradient saliency feature map is extracted, to resolve the problem that the feature cannot be matched due to the luminance distribution differences of the data of different sensors. The success rate of the multi-source image fusion and the quality of the fused image are improved. In addition, an actual depth of a scene in an image is estimated by using disparity information and a camera parameter, to provide reference information for requirements such as three-dimensional information reconstruction of a scene and image target estimation and tracking.

DESCRIPTION OF EMBODIMENTS

To make the objectives, technical solutions, and advantages of the present disclosure clearer, the following further describes the implementations of the present disclosure in detail with reference to the accompanying drawings.

Figure 1:
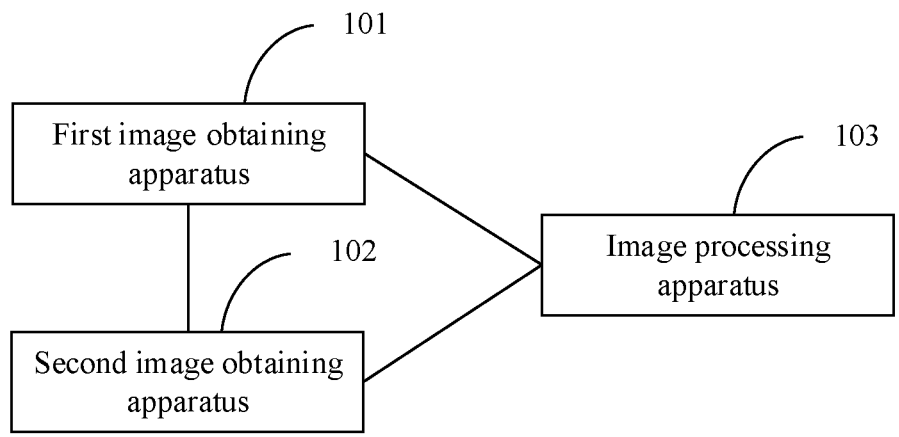
FIG. 1 is a schematic architectural diagram of an image processing system according to an embodiment of the present disclosure.

An image processing method provided in an embodiment of the present disclosure is applied to a system shown in FIG. 1. The system includes a first image obtaining apparatus 101, a second image obtaining apparatus 102, and an image processing apparatus 103. As an example, FIG. 1 includes only two image obtaining apparatuses. It may be understood that the system may further include more image obtaining apparatuses. The image processing apparatus may process images obtained from a plurality of image sources.

The system shown in FIG. 1 may be a physical device, for example, user equipment, including a mobile phone, a camera, an unmanned aerial vehicle having a shooting function, a laptop computer, and the like, and may include at least two cameras, namely, two image obtaining apparatuses. The system further includes the image processing apparatus, configured to process images shot by a plurality of cameras.

The system shown in FIG. 1 may also be a monitoring system. A plurality of image obtaining apparatuses, for example, cameras disposed at different locations, are connected to one central image processing apparatus in a wired or wireless manner, where the central image processing apparatus may process the images shot by the plurality of cameras.

The image obtaining apparatus usually includes modules such as an optical filtering lens, an imaging sensor, and an image processing module. The image obtaining apparatus may obtain images in different spectral bands by cooperating the optical filtering lens with the sensor. For example, the filter lens may be used to filter out light outside a visible spectrum band, and cooperate with a color/monochrome imaging sensor to obtain a color/monochrome visible light image. Alternatively, the filter lens may be used to filter out light outside an infrared spectrum band, and cooperate with the color/monochrome imaging sensor to obtain an infrared image. Further alternatively, a light-splitting lens may be used to cooperate with an imaging sensor array to obtain a multi-spectral image, an HSI, and the like. Different image obtaining apparatuses may output different images, for example, a visible light image, a near infrared image, a thermal infrared image, a multi-spectral image, an HSI, or the like, or a combination thereof.

Signals may be synchronized between the image obtaining apparatuses, so that time points for shooting images are as consistent as possible.

Figure 2:
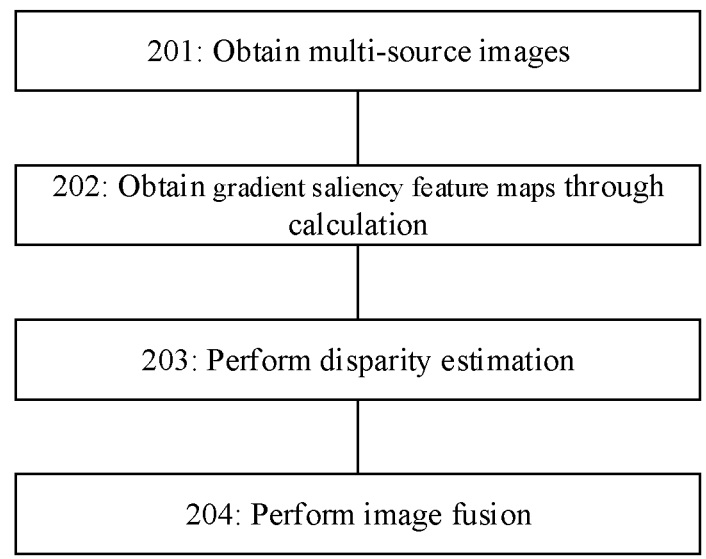
FIG. 2 is a schematic flowchart of an image processing method according to an embodiment of the present disclosure.

Applied to the system shown in the foregoing FIG. 1, an embodiment of the present disclosure provides an image processing method. As shown in FIG. 2, after obtaining images from a plurality of data sources, an image processing apparatus performs processing to obtain a fused image. In the following description, two images are used as an example. When there are a plurality of images, the plurality of images may be split into a plurality of groups of two images, and image fusion is performed pair by pair. Specifically, the following steps are included.

201. Obtain the images from the plurality of image sources.

For example, the image processing apparatus may obtain, by using the two image obtaining apparatuses shown in FIG. 1 at the same time, a first image and a second image in two different spectral bands, and calibrate, based on an imaging parameter such as initial calibration of a lens parameter, the shot image to have only horizontal disparity, or perform image calibration on the shot image. Optical axes of lenses of a first image obtaining apparatus and a second image obtaining apparatus are parallel, and a focal length is consistent, a direction of the image is adjusted, so that the image has disparity only in a horizontal direction.

The obtained first image and the obtained second image may be the foregoing visible light images, near infrared images, thermal infrared images, multi-spectral images, HSIs, or the like, or a combination thereof. In the following steps, an example in which the first image is the near infrared image and the second image is a color visible light image is used for description.

After obtaining an image, the image processing apparatus may further perform three-dimensional (3D) noise reduction processing on the image to suppress noise interference.

202. Obtain gradient saliency feature maps of the first image and the second image.

For the images obtained in the foregoing step, for example, the first image or the second image, the gradient saliency feature map of each image may be obtained through calculation according to the following method.

First, a horizontal gradient operator and a vertical gradient operator, for example a canny operator, a Sobel operator, or the like, are used to perform two-dimensional convolution filtering on N bands in one image. A vertical gradient $G_{nT}$ and a horizontal gradient $G_{nH}$ (n=1, 2, ..., N) of each band $I_n$ in the image are obtained based on the following formula $$G_{nT}=I_n \otimes M_T,$$

$$G_{nH}=I_n \otimes M_H,$$

$M_T$ and $M_H$ respectively represent the vertical gradient operator and the horizontal gradient operator, and $\otimes$ represents that a two-dimensional convolution operation is performed.

Then, based on the foregoing obtained gradient values, a gradient saliency feature $J_n$ of each pixel (x, y) in the image is calculated based on the following formula $$J_n(x, y) = \frac{\sqrt{[\sum_{x \in c_x} \alpha G_{nT}(x, y)]^2 + [\sum_{x \in c_x} \beta G_{nH}(x, y)]^2}}{\sum_{x \in c_x} \sqrt{\alpha^2 G_{nT}(x, y)^2 + \beta^2 G_{nH}(x, y)^2} + k}.$$

In the formula, $c_x$ is a neighborhood of a pixel x, $\alpha$ and $\beta$ are respectively weights of the vertical gradient and the horizontal gradient, $\alpha<\beta$ may be set to highlight a gradient parallel to a disparity direction, to improve accuracy of subsequent feature matching, and $k \in (0, 1)$ is a constant, and is usually set to 0.5. Because gradient directions around noise are different, this feature can suppress the noise interference.

Finally, weighted averaging is performed on each pixel in a gradient saliency feature map of each band based on the following formula to obtain a final gradient saliency map $$J(x, y) = \frac{\sum_{n=1}^{N} \lambda_n(x, y) J_n(x, y)}{\sum_{n=1}^{N} \lambda_n(x, y)}.$$

Where $\lambda_n \geq 0$ is a weight of an $n^{th}$ band. Specifically, for a color image, a multi-spectral image, or an HSI in a red, green, blue (RGB) format, a weight may be set to $\lambda^n=1$. For a color image in a Commission Internationale de L'Eclairage (CIE) format, a weight may be set to $\lambda_1=2.55$, $\lambda_2=1$, $\lambda_3=1$. Alternatively, according to the following formula, weights of l bands with greatest gradient saliency are set to 1 at a location x, and weights of other bands are set to 0, and particularly, when l is set to 1, J(x) is a maximum value of each $J_n$ (x, y) at the location x.

$$\lambda_i(x, y) = \begin{cases} 1 & J_i(x, y) \in \max_l (J_n(x, y)) \\ 0 & \text{otherwise} \end{cases}.$$

The gradient saliency feature map of the first image and the gradient saliency feature map of the second image may be obtained according to the foregoing method.

203. Perform disparity estimation.

For example, in low visible light illumination, light in a near infrared band is supplemented by using a controllable light source. The obtained first image is the near infrared image, and the obtained second image is the color visible light image. Then, the gradient saliency feature maps of the two images are obtained through calculation based on the foregoing steps. Then, the first image, namely, the near infrared image, is used as a reference, and the feature optimal matching is performed between any matching unit in the first image with the second image, to obtain a dense disparity map (dense disparity map) D of the first image. Each pixel value D(x, y) in the dense disparity map represents, in a distance of the disparity direction, a quantity of pixels that includes pixels $I_1$ (x, y) at a same location in the first image and corresponding pixels $I_2$ (X+D(x, y), y) in the second image.

Specifically, any matching unit $\phi_k$ in the first image, for example, a neighborhood of each pixel, is searched in the second image in the disparity direction, to obtain a disparity value $d_k$ that has a minimum feature difference $$d_k = \arg\min_{d \in (d_{min}, d_{max})} \left( \sum_{(x,y) \in \phi_k} |J_1(x, y) - J_2(x+d, y)| \right).$$

Where arg represents a value obtained when a following minimum value is true, $d_{min}$ and $d_{max}$ are respectively a minimum disparity search range and a maximum disparity search range, and the ranges can be obtained, according to a photography theorem, by using parameters such as an optical axis distance and a focal length, and $J_1$ and $J_2$ are respectively the gradient saliency feature map of the first image and the gradient saliency feature map of the second image.

When the matching unit is the neighborhood of each pixel, the disparity value obtained after the feature matching is performed on the neighborhood of each pixel is used as a disparity value of the pixel, and the disparity estimation may be performed on all pixels in the first image to obtain the dense disparity map D of the first image. Then, the second image may be used as a reference image, and a guided filtering operation such as joint bilateral filtering is performed, to improve region consistency of the disparity map.

204. Perform the image fusion. Based on the obtained dense disparity map of the first image, disparity translation is performed on a pixel in the second image corresponding to a pixel in the first image, and the first image and the pixel in the second image are fused.

For the near infrared first image and the color second image, the two images are first separately converted into color space in which luminance information and color information are represented by using different dimensions. The conversion may include formats such as a luminance-bandwidth-chrominance (YUV) format, the CIE format, a hue saturation value (HSV) format, and an HSI format.

Based on the dense disparity map obtained through calculation, and for each pixel in the near infrared first image, the translation is performed, based on a corresponding disparity value, on color information of a pixel that corresponds to each pixel in the near infrared first image and that is in the color second image, to obtain color information of a fused image, and the weighted averaging is performed on a luminance value of a pixel corresponding to the color second image and a luminance value of the near infrared first image to obtain luminance information of the fused image.

For the fused image, postprocessing such as color enhancement, histogram adjustment, and white balance may be further performed. The fused image may be stored in a storage device or sent to a network.

In the embodiment shown in the foregoing FIG. 2, a correlation between a texture and a contour that are of multi-source images is used, and the gradient saliency feature map is extracted, to resolve a problem that a feature cannot be matched due to luminance distribution differences of data of different sensors. A success rate of multi-source image fusion and quality of the fused image are improved. Specifically, in a case of the near infrared image and the color image, only infrared light compensation is performed, in a low illumination environment by using a feature that near infrared light is not easily perceived by human eyes, to obtain a clear color image, so that a light pollution problem caused by visible light compensation is avoided. Specifically, in a case of the thermal infrared image and the color image, contrast of objects with different temperature in the color image is enhanced by using the thermal infrared image.

In a haze scenario, an infrared image may be obtained by using a camera that has a longer infrared wavelength and better penetration performance for aerosol. Before fusion is performed, statistics-based defogging enhancement is performed on the color image, thereby improving quality of a fused image.

Figure 3:
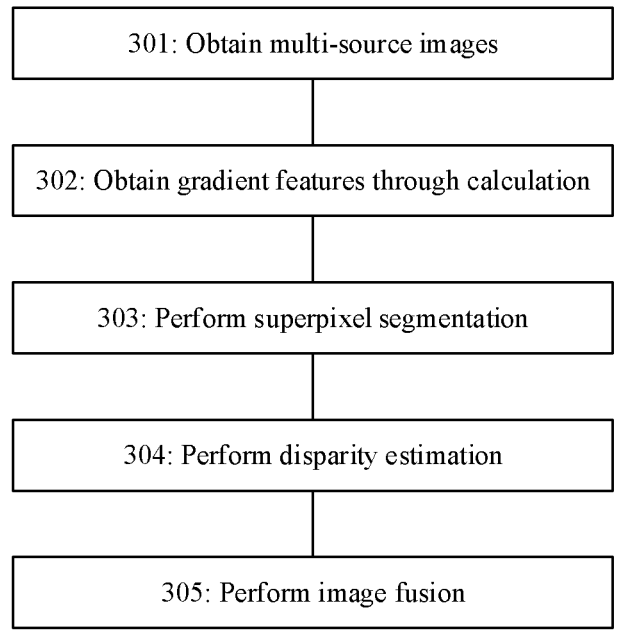
FIG. 3 is a schematic flowchart of another image processing method according to an embodiment of the present disclosure.

An embodiment of the present disclosure further provides another image processing method applied to the system shown in the foregoing FIG. 1. As shown in FIG. 3, after obtaining images from a plurality of data sources, an image processing apparatus performs processing to obtain a fused image. A difference from the method in FIG. 2 is that superpixel segmentation is performed on a first image, and when feature matching is performed to obtain a dense disparity map, a matching unit is a segmented superpixel. Specifically, the following steps are included.

301. Obtain the images from the plurality of image sources.

Same as step 201, the image processing apparatus may obtain, by using the image processing apparatuses at the same time, the first image and the second image in two different spectral bands, and calibrate the shot image to have only horizontal disparity.

302. Obtain gradient saliency feature maps (gradient saliency map) of the first image and the second image.

For the obtained first image and the obtained second image, the gradient saliency feature map of the first image and the gradient saliency feature map of the second image may be separately obtained through calculation according to the method in step 202.

303. Perform the superpixel segmentation on the first image.

The superpixel segmentation is to segment an image into small regions that include a plurality of pixel sets that are similar in spectrums and spatially adjacent, namely, to segment the image into a plurality of superpixels. One image is segmented into M superpixels $\Omega_m$, m=1, 2, . . . M, and the M superpixels cover the entire image I={$\Omega \cup \Omega_2 \cup \ldots \cup \Omega_m$}.

304. Perform disparity estimation.

Different from step 203, the matching unit in this step is the foregoing segmented superpixel. For example, in low visible light illumination, light in a near infrared band is supplemented by using a controllable light source. The obtained first image is a near infrared image, and the obtained second image is a color visible light image. Then, the gradient saliency feature maps of the two images are obtained through calculation based on the steps in the foregoing method. Then, the first image, namely, the near infrared image, is used as a reference, and the feature optimal matching is performed between any matching unit in the first image with the second image, to obtain a dense disparity map D of the first image. Each pixel value D(x, y) in the dense disparity map represents, in a distance of the disparity direction, a quantity of pixels that includes pixels $I_1$ (x,y) at a same location in the first image and corresponding pixels $I_2$(x+D(x,y),y) in the second image.

Specifically, any matching unit $\phi_k$ in the first image, for example, each superpixel, is searched in the second image in the disparity direction, to obtain a disparity value $d_k$ that has a minimum feature difference $$d_k = \arg\min_{d \in (d_{min}, d_{max})} \left( \sum_{(x,y) \in \phi_k} |J_1(x, y) - J_2(x + d, y)| \right).$$

Where arg represents a value obtained when a following minimum value is true, $d_{min}$ and $d_{max}$ are respectively a minimum disparity search range and a maximum disparity search range, and the ranges can be obtained, according to a photography theorem, by using parameters such as an optical axis distance and a focal length, and $J_1$ and $J_2$ are respectively the gradient saliency feature map of the first image and the gradient saliency feature map of the second image.

When the matching unit is the superpixel, the disparity value obtained after the feature matching is performed on each superpixel is used as a disparity value of all pixels in the superpixel, and the disparity estimation may be performed on all superpixels in the first image to obtain the dense disparity map D of the first image.

305. Perform image fusion.

Same as the step 204, based on the obtained dense disparity map of the first image, disparity translation is performed on a pixel in the second image corresponding to a pixel in the first image, and the first image and the pixel in the second image are fused.

For the foregoing near infrared first image and the foregoing color second image, the two images are first separately converted into color space in which luminance information and color information are represented by using different dimensions. Based on the dense disparity map obtained through calculation, and for each pixel in the near infrared first image, the translation is performed, based on a corresponding disparity value, on color information of a pixel that corresponds to each pixel in the near infrared first image and that is in the color second image, to obtain color information of a fused image, and the weighted averaging is performed on a luminance value of a pixel corresponding to the color second image and a luminance value of the near infrared first image to obtain luminance information of the fused image.

The segmentation and the matching in the method shown in FIG. 3 are used to provide better region consistency for disparity, so that accuracy of the disparity estimation is improved, and artifacts are further suppressed. Therefore, quality of the fused image is improved, and more accurate depth information is obtained.

An embodiment of the present disclosure further provides an image processing method. Fusion is performed between a color image and a thermal infrared image to highlight a temperature-abnormal target in the color image. The method is similar to the methods in FIG. 2 and FIG. 3, and specifically includes the following.

An image processing apparatus obtains a first image and a second image from two image obtaining apparatuses, where the first image is the color visible light image, and the second image is the thermal infrared image. A luminance value of each pixel in the thermal infrared image reflects corresponding temperature information. After the two images are obtained at the same time, the two images are calibrated to have only horizontal disparity, and a disparity range is determined.

Gradient saliency feature maps of the two images are obtained through calculation.

Feature matching is performed between a neighborhood of each pixel in the first image (color image) and the second image (thermal infrared image), to obtain a dense disparity map of the first image. Optionally, superpixel segmentation is first performed on the first image, and the feature matching is performed between each superpixel and the second image, to obtain the dense disparity map of the first image.

Based on the dense disparity map, and for each pixel in the color image, translation is performed, based on estimated disparity, on luminance information of a pixel that corresponds to each pixel in the color image and that is in the thermal infrared image. Then, the color image is used as a reference image, and a guided filtering operation such as joint bilateral filtering is performed on the translated thermal infrared image, so that the thermal infrared image has a more consistent contour with the color image. Finally, weighting is performed on a luminance value of the thermal infrared image and a luminance value of the color image to obtain a luminance value of a fused image, and color information remains unchanged, or a luminance value of the thermal infrared image is normalized and the normalized luminance value of the thermal infrared image is multiplied by the luminance value of the color image at a corresponding location to obtain the luminance value of the fused image, and the color information remains unchanged.

In the method, contrast between a temperature-abnormal scene and a surrounding environment in the color image is improved by using the thermal infrared image.

An embodiment of the present disclosure further provides an image processing method. Matching and fusion are performed between a texture image shot by a DVS camera and a visible light color image, and a fast capturing capability of the DVS is used to enable a motion blur region of a high speed target in a conventional color image to also have a clear texture. The method is similar to the methods in FIG. 2 and FIG. 3, and specifically includes the following.

An image processing apparatus obtains a first image and a second image from two image obtaining apparatuses, where the first image is the color visible light image, and the second image is the high speed texture image shot by the DVS camera. The two images are obtained at the same time, and an image that is in the high speed texture images and that is aligned with the color image in time domain is extracted as the second image. The two images are calibrated to have only horizontal disparity based on an imaging parameter, and a disparity range is determined.

Gradient saliency feature maps of the two images are obtained through calculation.

Feature matching is performed between a neighborhood of each pixel in the first image (color image) and the second image (DVS texture image), to obtain a dense disparity map of the first image. Optionally, superpixel segmentation is first performed on the first image, and the feature matching is performed between each superpixel and the second image, to obtain the dense disparity map of the first image.

Based on the dense disparity map, and for each pixel in the color image, translation is performed, based on estimated disparity, on luminance information of a pixel that corresponds to each pixel in the color image and that is in the DVS texture image. Then wavelet decomposition or pyramid decomposition is performed on a luminance component of the color image, to divide the luminance component into a low-frequency component and a high-frequency component. Finally, weighting is performed on the high-frequency component of the color image and the translated DVS texture image to obtain a new high-frequency component, and an inverse transform operation is performed on the low-frequency component of the color image to obtain a luminance component of a fused image. Color information of the original color image is used.

In the method, a texture detail at a corresponding location in the color image is improved by using the texture image in the DVS.

An embodiment of the present disclosure further provides an image processing method. Fusion is performed between an MSI image with a high spatial resolution and a low spectral resolution and an HSI image with a low spatial resolution and a high spectral resolution, to obtain an image with both the high spatial resolution and the high spectral resolution. The method is similar to the methods in FIG. 2 and FIG. 3, and specifically includes the following.

An image processing apparatus obtains a first image and a second image from two image obtaining apparatuses, where the first image is the MSI image shot by a multi-spectral camera, and the second image is the HSI image shot by an imaging spectrometer. The two images are obtained at the same time, and the spatial resolution of the original MSI image is reduced to be the same as that of the HSI image. The two images are calibrated to have only horizontal disparity based on an imaging parameter, and a disparity range is determined.

Gradient saliency feature maps of the two images are obtained through calculation.

Feature matching is performed between a neighborhood of each pixel in the first image (MSI image) and the second image (HSI texture image), to obtain a dense disparity map of the first image. Optionally, superpixel segmentation is first performed on the first image, and the feature matching is performed between each superpixel and the second image, to obtain the dense disparity map of the first image.

Based on the dense disparity map, and for each pixel in the MSI image, translation is performed, based on estimated disparity, on a pixel that corresponds to each pixel in the MSI image and that is in the HSI image. Then radiation calibration is performed on the MSI image and the HSI image, a spectral endmember of the MSI and a spectral endmember of the HSI are separately extracted in an endmember extraction method, and an initial abundance matrix of the MSI and an initial abundance matrix of the HSI are calculated. Finally, combined unmixing is performed by using a space spectrum correlation of the MSI and the HSI, the endmembers and the abundance matrices are updated to convergence by using multiplication iterations, and an obtained high spatial resolution abundance matrix is multiplied by a hyper-spectral endmember to obtain the fused image with the high spatial resolution and the high spectral resolution.

In the combined unmixing method, the MSI image and the HSI image are fused to obtain the image with the high spatial resolution and the high spectral resolution image.

Figure 4:
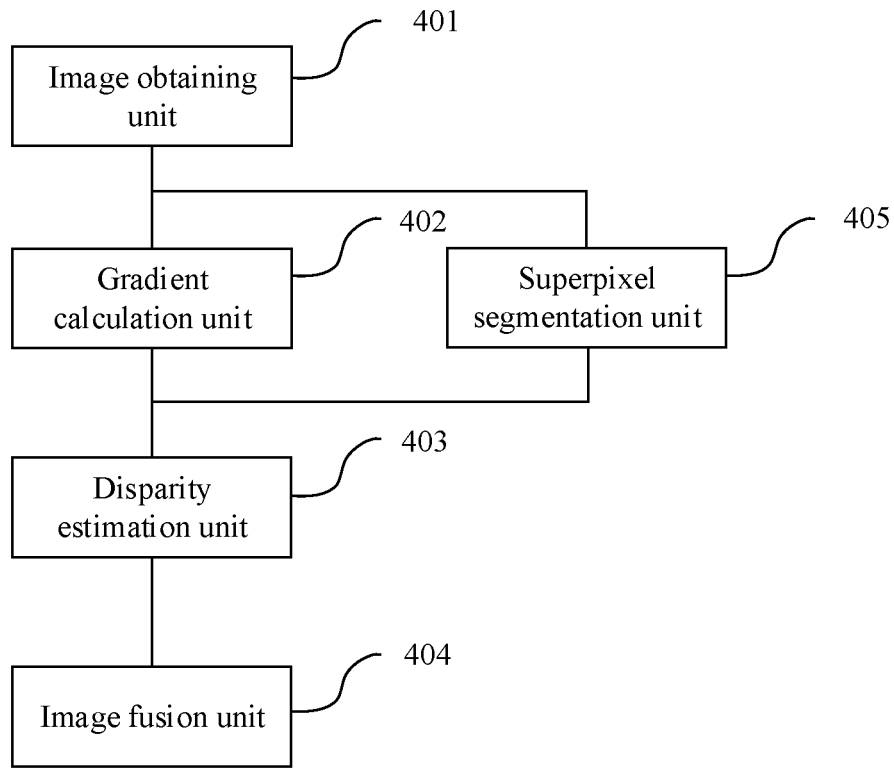
FIG. 4 is a schematic structural diagram of an image processing apparatus according to an embodiment of the present disclosure.

An embodiment of the present disclosure further provides a schematic structural diagram of an image processing apparatus. As shown in FIG. 4, the image processing apparatus includes an image obtaining unit 401, a gradient calculation unit 402, a disparity estimation unit 403, and an image fusion unit 404.

The image obtaining unit is configured to obtain a first image and a second image.

The gradient calculation unit is configured to, for the first image and the second image, separately obtain, through calculation, a gradient saliency feature map of the image.

The disparity estimation unit is configured to, based on the gradient saliency feature maps of the first image and the second image, perform feature matching between the first image and the second image to obtain a dense disparity map of the first image.

The image fusion unit is configured to, based on the dense disparity map of the first image, perform disparity translation on a pixel in the second image corresponding to a pixel in the first image, and fuse the first image and the pixel in the second image.

The image processing apparatus shown in FIG. 4 may further include a superpixel segmentation unit 405 that is configured to segment the first image into a plurality of superpixels.

Further, these units implement related functions in the foregoing methods, and details are not described again.

In this embodiment, the image processing apparatus is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions. In a simple embodiment, a person skilled in the art may figure out that the image processing apparatus may be implemented by using a processor, a memory, and a communications interface.

Figure 5:
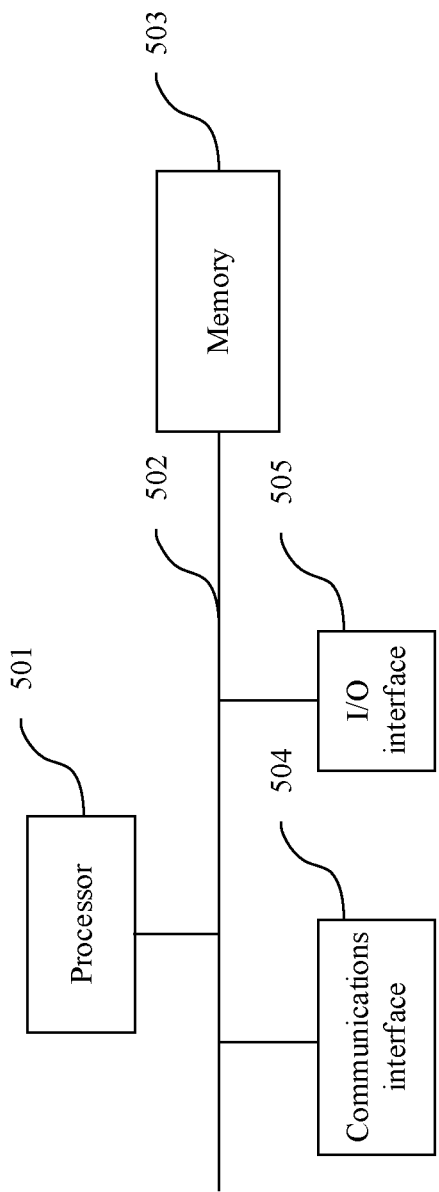
FIG. 5 is a schematic structural diagram of another image processing apparatus according to an embodiment of the present disclosure.

The image processing apparatus in this embodiment of the present disclosure may further be implemented in a manner of a computer device (or a system) in FIG. 5. FIG. 5 is a schematic diagram of a computer device according to an embodiment of the present disclosure. The computer device includes at least one processor 501, a communications bus 502, a memory 503, and at least one communications interface 504, and may further include an input/output (I/O) interface 505.

The processor may be a universal central processing unit (CPU), a microprocessor, an ASIC, or one or more integrated circuits configured to control execution of programs in solutions of the present disclosure.

The communications bus may include a channel for transmitting information between the foregoing components. The communications interface is configured to communicate with another device or a communications network such as an Ethernet, a radio access network (RAN), or a wireless local area network (WLAN) by using any apparatus of a transceiver type.

The memory may be a read-only memory (ROM) or another type of static storage device that can store static information and instructions, or a random-access memory (RAM) or another type of dynamic storage device that can store information and instructions, or may further be an electrically erasable programmable read-only memory (EEPROM), a compact disc read-only memory (CD-ROM) or another compact disc storage, an optical disc storage (including a compressed optical disc, a laser disc, an optical disc, a digital versatile optical disc, a blue-ray optical disc, and the like), a magnetic disk storage medium or another magnetic storage device, or any other computer-accessible medium that can be used to carry or store expected program code in an instruction or in a data structure form, without being limited thereto though. The memory may exist independently, and is connected to the processor through the bus. The memory may alternatively be integrated with the processor.

The memory is configured to store application program code used to execute the solutions of the present disclosure, and the execution is controlled by the processor. The processor is configured to execute the application program code stored in the memory.

In a specific implementation, the processor may include one or more CPUs, and each CPU may be a single-core processor or a multi-core processor. The processor herein may be one or more devices, circuits, and/or processing cores for processing data (for example, computer program instructions).

In a specific implementation, in an embodiment, the computer device may further include an I/O interface. For example, the output device may be a liquid-crystal display (LCD), a light-emitting diode (LED) display device, a cathode-ray tube (CRT) display device, a projector, or the like. The input device may be a mouse, a keyboard, a touchscreen device, a sensor device, at least two imaging sensors, or the like.

The computer device may be a general-purpose computer device or a dedicated computer device. In a specific implementation, the computer device may be a desktop computer, a portable computer, a network server, a personal digital assistant (PDA), a mobile phone, a tablet computer, a wireless terminal device, a communications device, an embedded device, or a device with a structure similar to that in FIG. 5. A type of the computer device is not limited in this embodiment of the present disclosure.

The image processing apparatus in FIG. 1 may be the device shown in FIG. 5, and the memory stores one or more software modules. The image processing apparatus may implement the software module by using the processor and the program code in the memory, to implement the foregoing methods.

An embodiment of the present disclosure further provides a computer storage medium, configured to store computer software instructions used by the device shown in the foregoing FIG. 4 or FIG. 5, where the computer storage medium includes a program designed for executing the foregoing method embodiments. The foregoing methods can be implemented by executing the stored program.

Although the present disclosure is described with reference to the embodiments, in a process of implementing the present disclosure that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus or device, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present disclosure is described with reference to the flowcharts and/or block diagrams of the method, the apparatus or device, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Although the present disclosure is described with reference to specific features and embodiments thereof, it is obvious that various modifications and combinations may be made thereto. Correspondingly, the specification and accompanying drawings are merely exemplary description of the present disclosure defined by the accompanying claims, and is considered as any of or all modifications, variations, combinations or equivalents that cover the scope of the present disclosure. Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. An image processing method, comprising:
    obtaining a first image;
    obtaining a second image;
    extracting a first vertical gradient and a first horizontal gradient of each band in the first image using a first gradient operator;
    extracting a second vertical gradient and a second horizontal gradient of each band in the second image using a second gradient operator;
    calculating a first gradient saliency feature map of each band in the first image based on the first vertical gradient and the first horizontal gradient;
    performing weighted averaging on each pixel in the first gradient saliency feature map of each band in the first image to obtain a first gradient saliency map of the first image;

calculating a second gradient saliency feature map of each band in the second image based on the second vertical gradient and the second horizontal gradient;

performing weighted averaging on each pixel in the second gradient saliency feature map of each band in the second image to obtain a second gradient saliency map of the second image;

performing, based on the first gradient saliency feature map and the second gradient saliency feature map, feature matching between the first image and the second image to obtain a dense disparity map of the first image;

performing disparity translation on a second pixel in the second image corresponding to a first pixel in the first image based on the dense disparity map; and fusing, based on the dense disparity map, the first image and the second pixel.

2. The image processing method of claim 1, wherein after obtaining the first image and obtaining the second image, the image processing method further comprises adjusting the first image or the second image such that there is only a horizontal disparity between the first image and the second image.

3. The image processing method of claim 1, further comprising searching, in the second image along a disparity direction, for a matching unit in the first image to obtain a disparity value that has a minimum feature difference.

4. The image processing method of claim 3, wherein the matching unit is a neighborhood of each pixel in the first image, and wherein the image processing method further comprises:

using the disparity value for the first pixel; and performing feature matching on all pixels in the first image to obtain the dense disparity map of the first image.

5. The image processing method of claim 3, wherein the first image comprises a plurality of superpixels, wherein the matching unit is one of the superpixels, and wherein the image processing method further comprises searching for each of the superpixels in the second image along the disparity direction to obtain the disparity value.

6. The image processing method of claim 1, wherein the first image is a near infrared image, wherein the second image is a color visible light image, and wherein the image processing method further comprises:

translating first color information of a pixel that corresponds to each pixel in the near infrared image and that is in the color image to obtain second color information of a fused image based on a corresponding disparity value, based on the dense disparity map, and for each pixel in the near infrared image; and performing weighted averaging on a first luminance value of a pixel of the color image and a second luminance value of the near infrared image to obtain luminance information of the fused image based on the dense disparity map and for each pixel in the near infrared image.

7. The image processing method of claim 1, wherein the first image is a color visible light image, wherein the second image is a thermal infrared image, and wherein the image processing method further comprises:

translating luminance information of a pixel that corresponds to each pixel in the color image and that is in the thermal infrared image based on the dense disparity map, based on an estimated disparity, and for each pixel in the color image; and performing weighting on a first luminance value of the thermal infrared image and a second luminance value of the color image to obtain a third luminance value of a fused image or normalizing the first luminance value and multiplying the first luminance value by the second luminance value at a corresponding location to obtain the third luminance value.

8. The image processing method of claim 1, wherein the first image is a color visible light image, wherein the second image is a dynamic vision sensor (DVS) texture image, and wherein the image processing method further comprises:

translating luminance information of a pixel that corresponds to each pixel in the color image and that is in the DVS texture image based on the dense disparity map, based on an estimated disparity, and for each pixel in the color image;

performing wavelet decomposition or pyramid decomposition on a first luminance component of the color image to divide the first luminance component into a low-frequency component and a high-frequency component;

performing weighting on the high-frequency component and the DVS texture image to obtain a new high-frequency component; and performing an inverse transform operation on the low-frequency component to obtain a second luminance component of a fused image.

9. The image processing method of claim 1, wherein the first image is a multispectral image (MSI), wherein the second image is a hyperspectral image (HSI), and wherein the image processing method further comprises:

translating a pixel that corresponds to each pixel in the MSI image and that is in the HSI image based on the dense disparity map, based on an estimated disparity, and for each pixel in the MSI image;

performing radiation calibration on the MSI image;

performing radiation calibration on the HSI image;

extracting a first spectral endmember of the MSI and a second spectral endmember of the HSI using an endmember extraction method;

calculating a first initial abundance matrix of the MSI;

calculating a second initial abundance matrix of the HSI;

performing combined unmixing using a space spectrum correlation of the MSI and the HSI;

updating the first spectral endmember, the second spectral endmember, and the abundance matrices to convergence using multiplication iterations; and multiplying an obtained high spatial resolution abundance matrix by a hyper-spectral endmember to obtain a fused image.

10. The image processing method of claim 1, wherein the first image comprises a plurality of superpixels, wherein a matching unit along a disparity direction in the second image is one of the plurality of superpixels, and wherein the image processing method further comprises searching for each of the plurality of superpixels in the second image along the disparity direction to obtain the disparity value.

11. An image processing apparatus, comprising:

a sensor configured to:
  generate a first image; and
  generate a second image;

a chip coupled to the sensor and configured to:
  receive the first image from the sensor;
  receive the second image from the sensor;
  extract a first vertical gradient and a first horizontal gradient of each band in the first image using a first gradient operator;

extract a second vertical gradient and a second horizontal gradient of each band in the second image using a second gradient operator;

calculate a first gradient saliency feature map of each band in the first image based on the first vertical gradient and the first horizontal gradient;

perform weighted averaging on each pixel in the first gradient saliency feature map of each band in the first image to obtain a first gradient saliency map of the first image;

calculate a second gradient saliency feature map of each band in the second image based on the second vertical gradient and the second horizontal gradient;

perform weighted averaging on each pixel in the second gradient saliency feature map of each band in the second image to obtain a second gradient saliency map of the second image;

perform, based on the first gradient saliency feature map and the second gradient saliency feature map, feature matching between the first image and the second image to obtain a dense disparity map of the first image;

perform disparity translation on a pixel in the second image corresponding to a pixel in the first image based on the dense disparity map of the first image; and fuse the first image and the pixel in the second image.

12. The image processing apparatus of claim 11, wherein after the chip receives the first image and the second image, and the chip is further configured to adjust the first image or the second image such that there is a horizontal disparity between the first image and the second image.

13. The image processing apparatus of claim 11, wherein the chip is further configured to search, in the second image along a disparity direction, for a matching unit in the first image, to obtain a disparity value that has a minimum feature difference.

14. The image processing apparatus of claim 13, wherein the matching unit is a neighborhood of each pixel in the first image, and wherein the chip is further configured to:

use the disparity value for the first pixel; and perform feature matching on all pixels in the first image to obtain the dense disparity map of the first image.

15. The image processing apparatus of claim 13, wherein the first image comprises a plurality of superpixels, wherein the matching unit is one of the superpixels, and wherein the chip is further configured to search for each of the superpixels in the second image along the disparity direction to obtain the disparity value.

16. The image processing apparatus of claim 11, wherein the first image is a near infrared image, wherein the second image is a color visible light image, and wherein the chip is further configured to:

translate first color information of a pixel that corresponds to each pixel in the near infrared image and that is in the color image to obtain second color information of a fused image based on the dense disparity map and for each pixel in the near infrared image; and perform weighted averaging on a first luminance value of a pixel of the color image and a second luminance value of the near infrared image to obtain luminance information of the fused image based on the corresponding disparity value, the dense disparity map, and for each pixel in the near infrared image.

17. The image processing apparatus of claim 11, wherein the first image is a color visible light image, wherein the second image is a thermal infrared image, and wherein the chip is further configured to:

translate luminance information of a pixel that corresponds to each pixel in the color image and that is in the thermal infrared image based on the dense disparity map, an estimated disparity, and for each pixel in the color image; and perform weighting on a first luminance value of the thermal infrared image and a second luminance value of the color image to obtain a third luminance value of a fused image or normalize the first luminance value and multiply the first luminance value by the second luminance value at a corresponding location to obtain the third luminance value.

18. The image processing apparatus of claim 11, wherein the first image is a color visible light image, wherein the second image is a dynamic vision sensor (DVS) texture image, and wherein the chip is further configured to:

translate luminance information of a pixel that corresponds to each pixel in the color image and that is in the DVS texture image based on the dense disparity map, based on an estimated disparity, and for each pixel in the color image;

perform wavelet decomposition or pyramid decomposition on a first luminance component of the color image, to divide the first luminance component into a low-frequency component and a high-frequency component;

perform weighting on the high-frequency component and the DVS texture image to obtain a new high-frequency component; and perform an inverse transform operation on the low-frequency component to obtain a second luminance component of a fused image.

19. The image processing apparatus of claim 11, wherein the first image is a multispectral image (MSI), wherein the second image is a hyperspectral image (HSI), and wherein the chip is further configured to:

translate a pixel that corresponds to each pixel in the MSI image and that is in the HSI image based on the dense disparity map, based on an estimated disparity, and for each pixel in the MSI image;

perform radiation calibration on the MSI image;

perform radiation calibration on the HSI image;

extract a first spectral endmember of the MSI and a second spectral endmember of the HSI using an endmember extraction method;

calculate a first initial abundance matrix of the MSI;

calculate a second initial abundance matrix of the HSI;

perform combined unmixing using a space spectrum correlation of the MSI and the HSI;

update the first spectral endmember, the second spectral endmember, and the abundance matrices to convergence using multiplication iterations; and multiply an obtained high spatial resolution abundance matrix by a hyper-spectral endmember to obtain a fused image.

20. The image processing apparatus of claim 11, wherein the first image comprises a plurality of superpixels, wherein a matching unit along a disparity direction in the second image is one of the plurality of superpixels, and wherein the chip is further configured to search for each of the plurality of superpixels in the second image along the disparity direction to obtain the disparity value.

\* \* \* \* \*